ELECTRICAL PULSE TIMING OR DELAY CIRCUIT

Filed Oct. 11, 1951 10 Sheets-Sheet 1

INVENTOR
Donald J. Oda
BY
Floyd M. Harris
ATTORNEY

ELECTRICAL PULSE TIMING OR DELAY CIRCUIT

Filed Oct. 11, 1951 10 Sheets-Sheet 2

INVENTOR
Donald J. Oda
BY
Floyd M. Harris
ATTORNEY

ELECTRICAL PULSE TIMING OR DELAY CIRCUIT

INVENTOR
Donald J. Oda
BY
Floyd M. Harris
ATTORNEY

ELECTRICAL PULSE TIMING OR DELAY CIRCUIT

INVENTOR
Donald J. Oda
BY Floyd M. Harris
ATTORNEY

Fig. 5.

TABULATION OF BINARY COUNTER PLATES NECESSARY TO MIX IN ORDER TO GET CORRECT DELAY FOR EACH SWITCH POSITION ON S-101 & S-102

| | S-101 | | | S-102 | | |
|---|---|---|---|---|---|---|
| SWITCH POSITION | STAGE 1 | 2 | 3 | STAGE 3 | 4 | 5 |
| 1 | A | A | A | A | A | A |
| 2 | B | A | A | B | A | A |
| 3 | A | B | A | A | B | A |
| 4 | B | B | A | B | B | A |
| 5 | A | A | B | A | A | B |
| 6 | B | A | B | B | A | B |
| 7 | A | B | B | A | B | B |
| 8 | B | B | B | B | B | B |

NOTE: AS INDICATED IN FIG. 3, A REPRESENTS THE PLATE ON THE LEFT SIDE OF THE BINARY AND B REPRESENTS THE PLATE ON THE RIGHT SIDE OF THE BINARY.

Fig. 10.

| SWITCH POSITIONS | BINARY STAGES 1 | 2 | 3 | 4 | |
|---|---|---|---|---|---|
| 1 | A | A | A | A | |
| 2 | D | A | A | A | |
| 3 | A | B | A | A | |
| 4 | B | B | A | A | |
| 5 | A | A | B | A | |
| 6 | B | A | B | A | |
| 7 | A | B | B | A | |
| 8 | B | B | B | A | |
| 9 | A | A | A | B | |
| 10 | B | A | A | B | |
| 11 | A | B | A | B | |
| 12 | B | B | A | B | |
| 13 | A | A | B | B | |
| 14 | B | A | B | B | |
| 15 | A | B | B | B | |
| 16 | B | B | B | B | |
| 1 | A | A | A | A | |
| 2 | B | A | A | A | |
| 3 | A | B | A | A | |
| 4 | B | B | A | A | |

NOTE: A&B REPRESENTS THE LEFT AND RIGHT PLATES OF A BINARY STAGE, RESPECTFULLY.

Fig. 11.

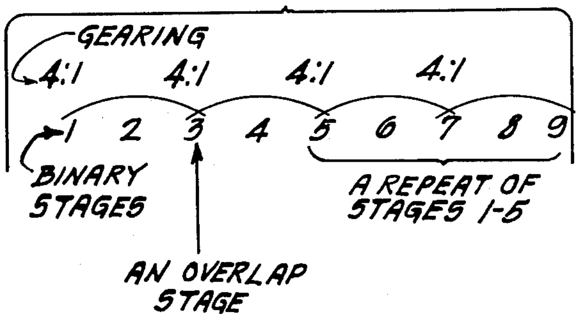

INVENTOR
Donald J. Oda
BY
Floyd M. Harris
ATTORNEY

Sept. 13, 1955 D. J. ODA 2,717,958

ELECTRICAL PULSE TIMING OR DELAY CIRCUIT

Filed Oct. 11, 1951 10 Sheets-Sheet 6

INVENTOR
Donald J. Oda
BY
Floyd M. Harris
ATTORNEY

ELECTRICAL PULSE TIMING OR DELAY CIRCUIT

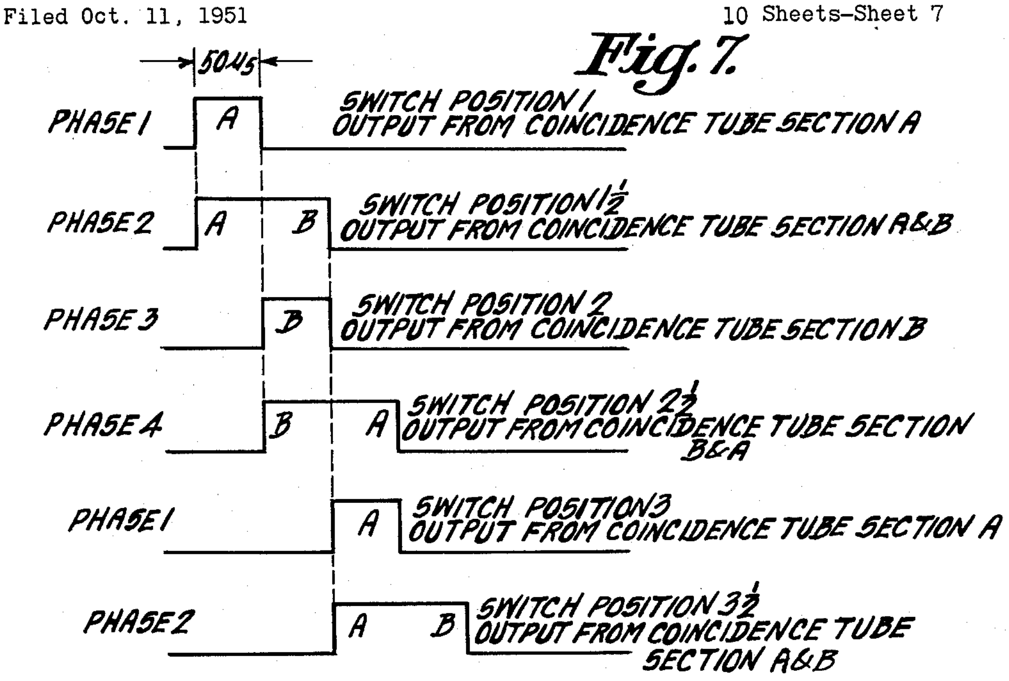

Fig. 7.

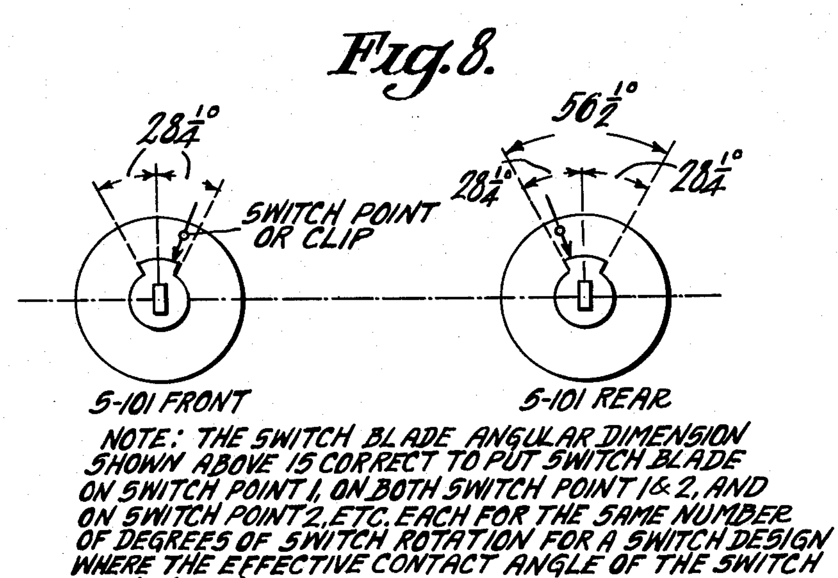

Fig. 8.

NOTE: THE SWITCH BLADE ANGULAR DIMENSION SHOWN ABOVE IS CORRECT TO PUT SWITCH BLADE ON SWITCH POINT 1, ON BOTH SWITCH POINT 1 & 2, AND ON SWITCH POINT 2, ETC. EACH FOR THE SAME NUMBER OF DEGREES OF SWITCH ROTATION FOR A SWITCH DESIGN WHERE THE EFFECTIVE CONTACT ANGLE OF THE SWITCH POINT (CLIP) IS 11 DEGREES.

INVENTOR
Donald J. Oda
BY
Floyd M. Harris
ATTORNEY

Sept. 13, 1955 D. J. ODA 2,717,958

ELECTRICAL PULSE TIMING OR DELAY CIRCUIT

Filed Oct. 11, 1951 10 Sheets-Sheet 8

INVENTOR
Donald J. Oda
BY
Floyd M. Harris
ATTORNEY

Sept. 13, 1955 D. J. ODA 2,717,958

ELECTRICAL PULSE TIMING OR DELAY CIRCUIT

Filed Oct. 11, 1951 10 Sheets-Sheet 9

INVENTOR
Donald J. Oda
BY
Floyd M. Harris
ATTORNEY

ELECTRICAL PULSE TIMING OR DELAY CIRCUIT

Filed Oct. 11, 1951 10 Sheets-Sheet 10

INVENTOR
Donald J. Oda
BY
Floyd M. Harris
ATTORNEY

United States Patent Office 2,717,958

Patented Sept. 13, 1955

2,717,958

ELECTRICAL PULSE TIMING OR DELAY CIRCUIT

Donald J. Oda, Runnemede, N. J., assignor to Radio Corporation of America, a corporation of Delaware Application October 11, 1951, Serial No. 250,919

15 Claims. (Cl. 250—27)

My invention relates to electrical timing circuits and, according to one aspect of the invention, particularly to timing circuits for obtaining an electrical wave such as a pulse that is continuously variable in delay or timing.

It has previously been proposed to obtain a pulse continuously variable in delay by employing geared phase shifters of the goniometer type, for example, and applying the outputs of the phase shifters to a coincidence circuit. In this way the pulse output of the coincidence circuit may be given a repetition rate determined by the lowest frequency signal applied to the coincidence circuit, and an accuracy in delay or timing determined by the highest frequency signal applied to the coincidence circuit. Such a system is described, for example, in Patent 2,526,287, issued October 17, 1950, to Stuart W. Seeley. The same basic system is disclosed in Patent 2,466,044, issued April 5, 1949, to Earl H. Schoenfeld. In the system described by Schoenfeld the highest frequency pulses are shifted in time by means of a goniometer type phase shifter while the lower frequency pulses are shifted by means of circuits that clip a sawtooth wave at varying levels, instead of by means of a goniometer type phase shifter.

The present invention makes it possible to employ binary counters for delaying the lower frequency pulses in timing systems of the type described in the above-mentioned Seeley and Schoenfeld patents. This is advantageous to certain applications as in Loran receivers, for example.

One object of the invention, as indicated above, is to provide an improved timing circuit for producing an electrical wave continuously variable in delay.

A further object of the invention is to provide an improved timing system employing binary counters.

A still further object of the invention is to provide a method of and means for obtaining from a binary counter chain pulses that are delayed by successively increasing amounts without momentarily losing pulse signal.

In practicing a preferred embodiment of the invention, a switching and coincidence circuit combination is employed that gives an output such that there is never loss of a pulse as the counter is switched from one switch position to the next. More specifically, for example, a double blade count selecting switch is on both of two adjacent contact points for an interval as it moves from one contact to the next contact. Also, the two switches feed into a double or dual coincidence tube which circuitwise is a pair of coincidence tubes having separate inputs and a common output. As a result, the output of this dual coincidence tube is first one counter pulse, then both said one pulse and the next succeeding pulse, and then said next succeeding pulse only.

In a specific example hereinafter described of a continuously variable delay system embodying the present invention, a continuously variable phase shifter, such as one of the goniometer type, is employed in combination with a chain of binary counters and associated switches and coincidence circuits. Suitable gearing is provided between the goniometer and the switches, and between groups or banks of switches. Goniometer and counter outputs are applied to coincidence circuits. The final output is a selected one of the goniometer delayed pulses.

The invention will be better understood from the following description taken in connection with the accompanying drawing in which:

Fig. 5 is a tabulation of the plates of the several binary stages that should be applied to the coincident circuit to get the correct delay for each switch position;

Fig. 7 is a group of graphs that are referred to in explaining how the invention functions to prevent momentary loss of a pulse when switching from one switch position to another;

Fig. 8 shows one example of a properly designed switch for use in the present invention;

Fig. 10 is a tabulation of the plates of the several binary stages to be connected to the coincidence circuit to get the correct delay for each switch position for an embodiment of the invention employing seven binary stages;

Fig. 11 is a schematic showing of an embodiment of the invention designed specifically for use in a Loran receiver;

Figure 1A:
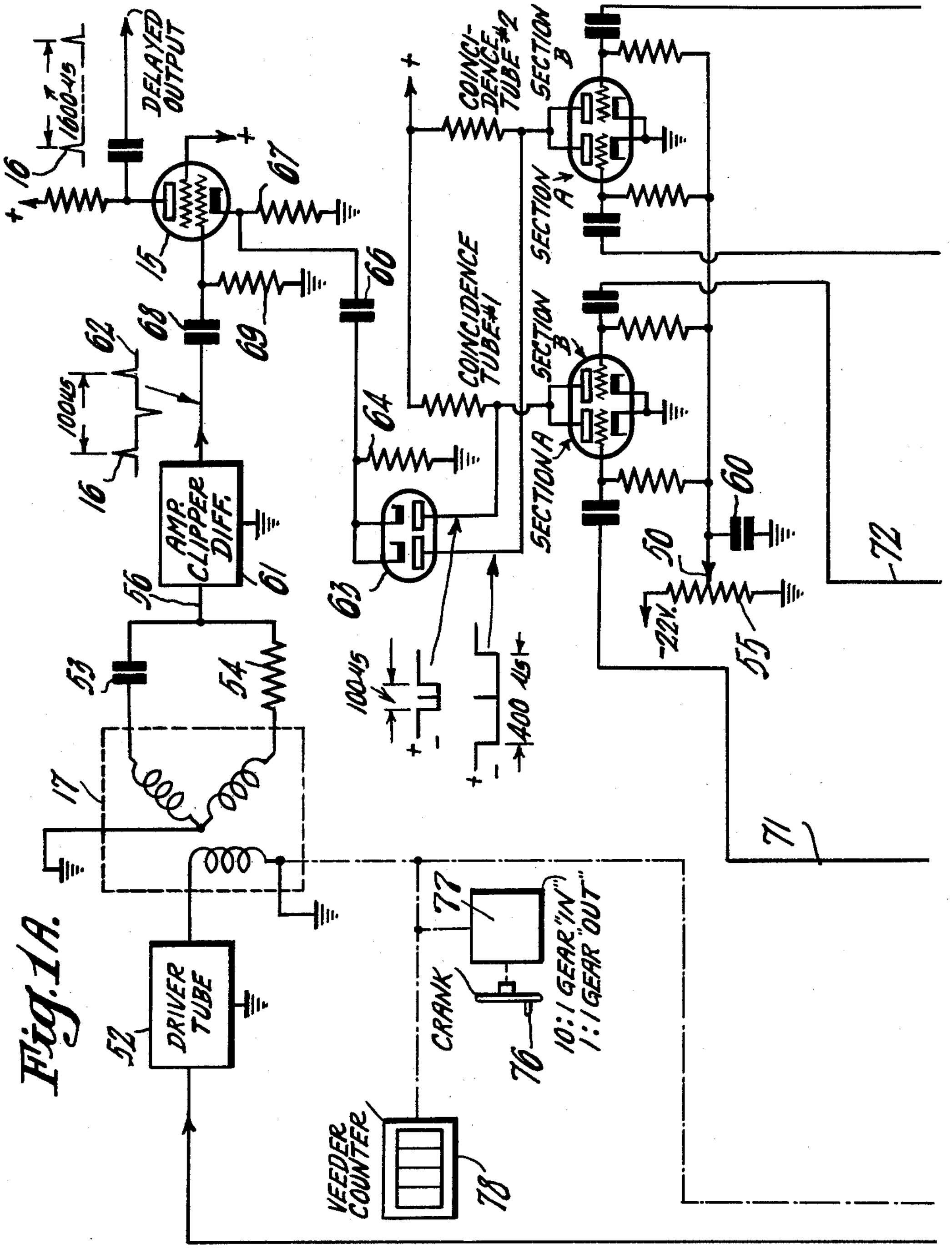
Figs. 1A and 1B are a block and circuit diagram of a timing system for supplying electrical pulses continuously variable in delay which is designed in accordance with one embodiment of the invention.
Figure 1B:
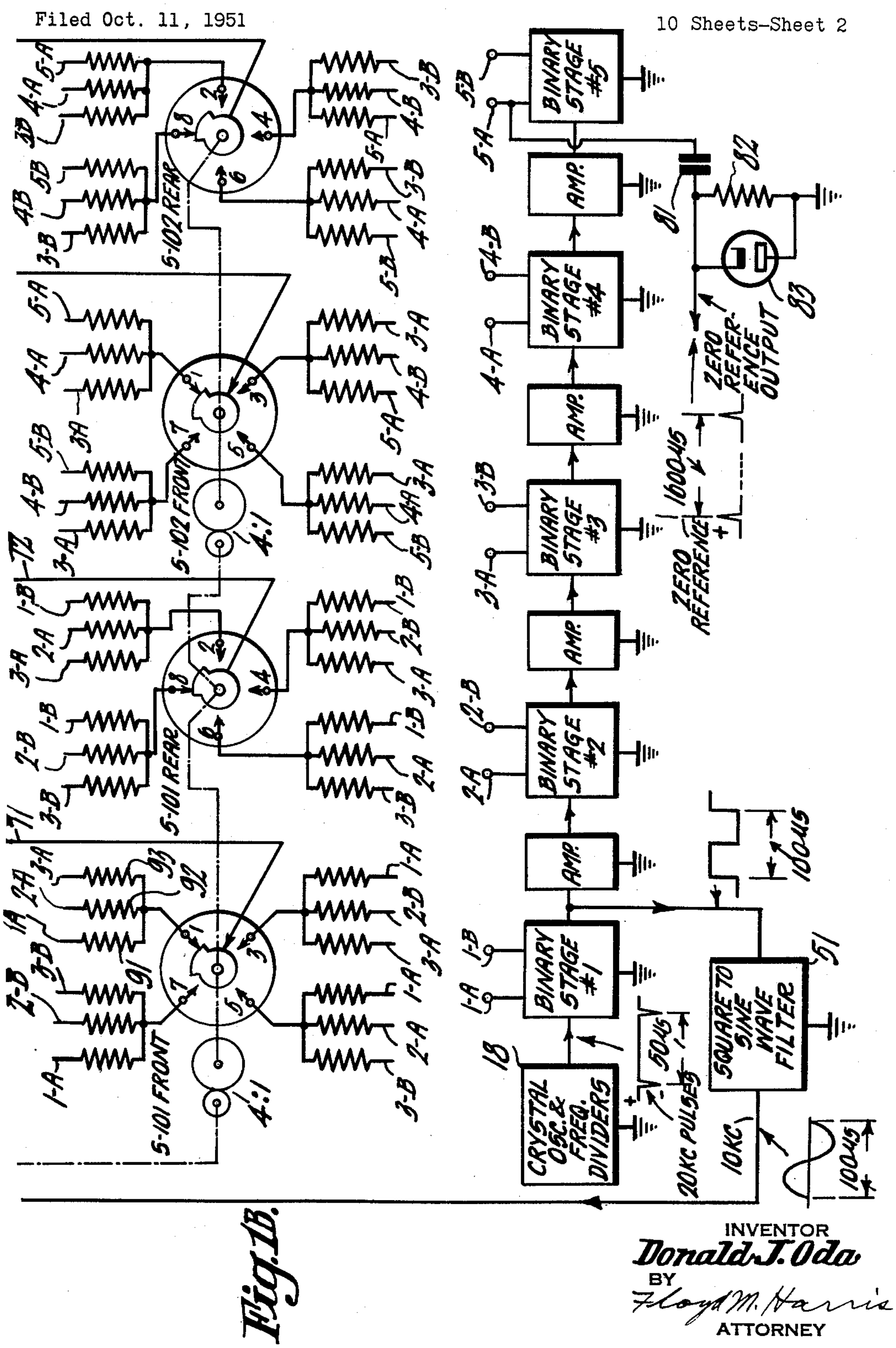

Figs. 1A and 1B show one specific example of a timing circuit embodying the invention that supplies at the output of a coincidence tube 15 a selected goniometer output pulse 16 that has a repetition period of 1600 $\mu$s. This repetition period is determined by the repetition period of binary stage No. 5 of the counter chain as will become apparent from the following description. The action of the goniometer phase shifter 17 causes the pulse 16 to be shifted in time continuously and precisely.

The switch setting of the system as shown in Figs. 1A and 1B is for zero delay. This corresponds to the condition illustrated in Fig. 9.

The binary counter chain consists of five stages No. 1 through No. 5 in the specific example shown in Figs. 1A and 1B. Preferably, each stage is coupled to the next through an isolating amplifier as indicated in the drawing. The counter chain is driven by 20 kc. (kilocycles) pulses from a suitable stable frequency source 18.

Figure 2:
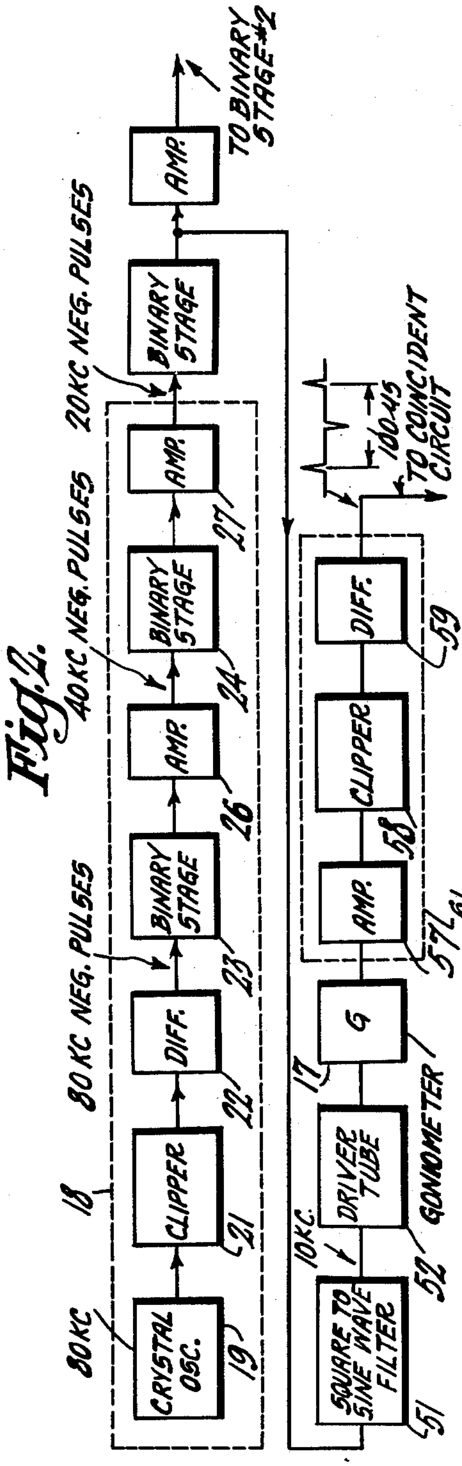
Fig. 2 is a block diagram showing in more detail certain blocked portions of Figs. 1A and 1B.

As shown in Fig. 2 the source 18 may comprise an 80 kc. crystal oscillator 19, a clipper 21, differentiating circuit 22, binary stages 23 and 24 with isolating amplifiers 26 and 27. The unit 18 might consist of a 20 kc. crystal oscillator with clipping and differentiating circuits, but in practice an 80 kc. crystal oscillator gives crystal stability and accuracy, and at the same time keeps the crystal unit at a smaller and more practical physcial size.

Figure 3:
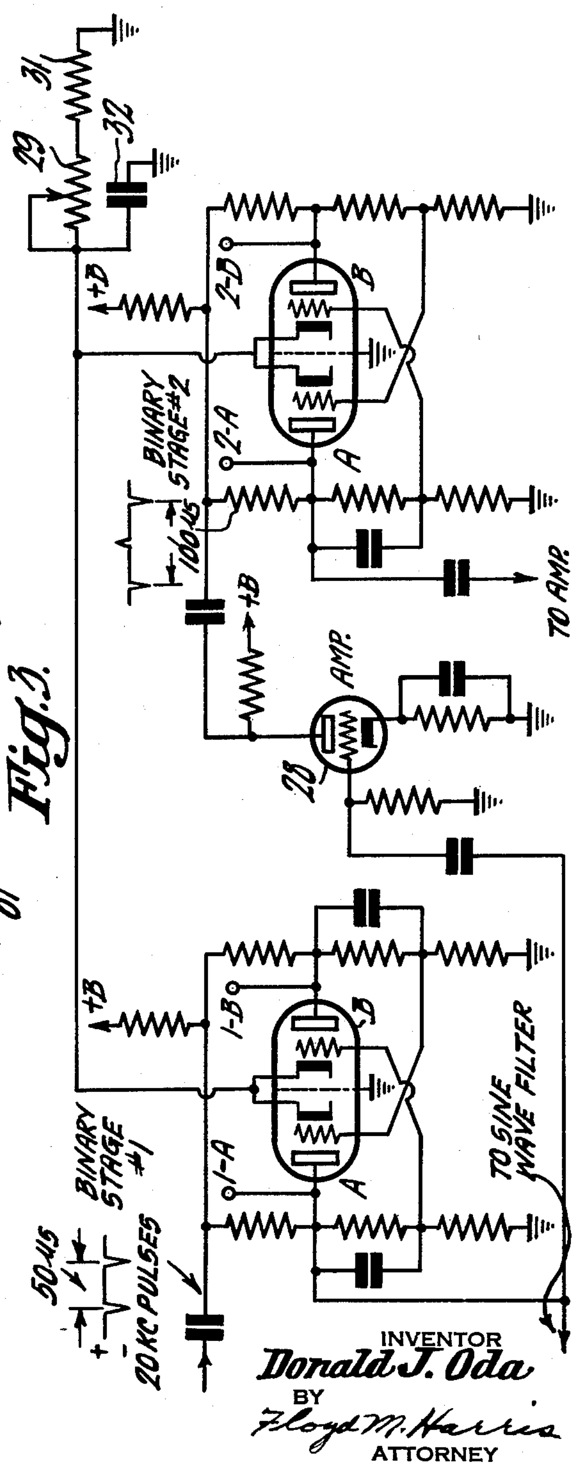
Fig. 3 is a circuit diagram of the binary stages No. 1 and No. 2 of the binary counter chain shown in Fig. 1B.

Fig. 3 shows the binary stages No. 1 and No. 2 in detail with the isolating amplifier 28. The additional binary stages Nos. 3, 4, and 5 are the same as the ones illustrated. Each binary stage is a multivibrator of the Eccles-Jordan type. Such binary stages are too well known to require further description.

It should be noted that in Fig. 3 the output from stage No. 1 is differentiated at the input of amplifier 28, and that the positive differentiated pulses are amplified more than the negative ones and are reversed in polarity to provide the 100 μs. negative pulses for triggering stage No. 2 as indicated. Also note that the output of the amplifier tube 28 is differentiated by the coupling capacitor and the common plate load resistor of the Eccles-Jordan type multivibrator. This arrangement gives very good performance in practice. The coupling between the other binary stages is similar to that just described.

Common bias for all binary stages may be provided by cathode bias resistors 29 and 31 and by-pass capacitor 32 if desired.

It should be noted that the left and right sides of each tube in a binary stage are identified as the A and B sides, respectively. Note that in stage No. 1 there are switch terminals from the left and right plates that are marked 1–A and 1–B, respectively. Likewise, in stage No. 2 the switch terminals from the left and right plates are marked 2–A and 2–B, respectively. This system of marking is applied also to stages No. 3, No. 4, and No. 5 and corresponds to the terminal markings of the binary stages shown in Fig. 1B.

Figures 9, 9A, 9B, 9C:
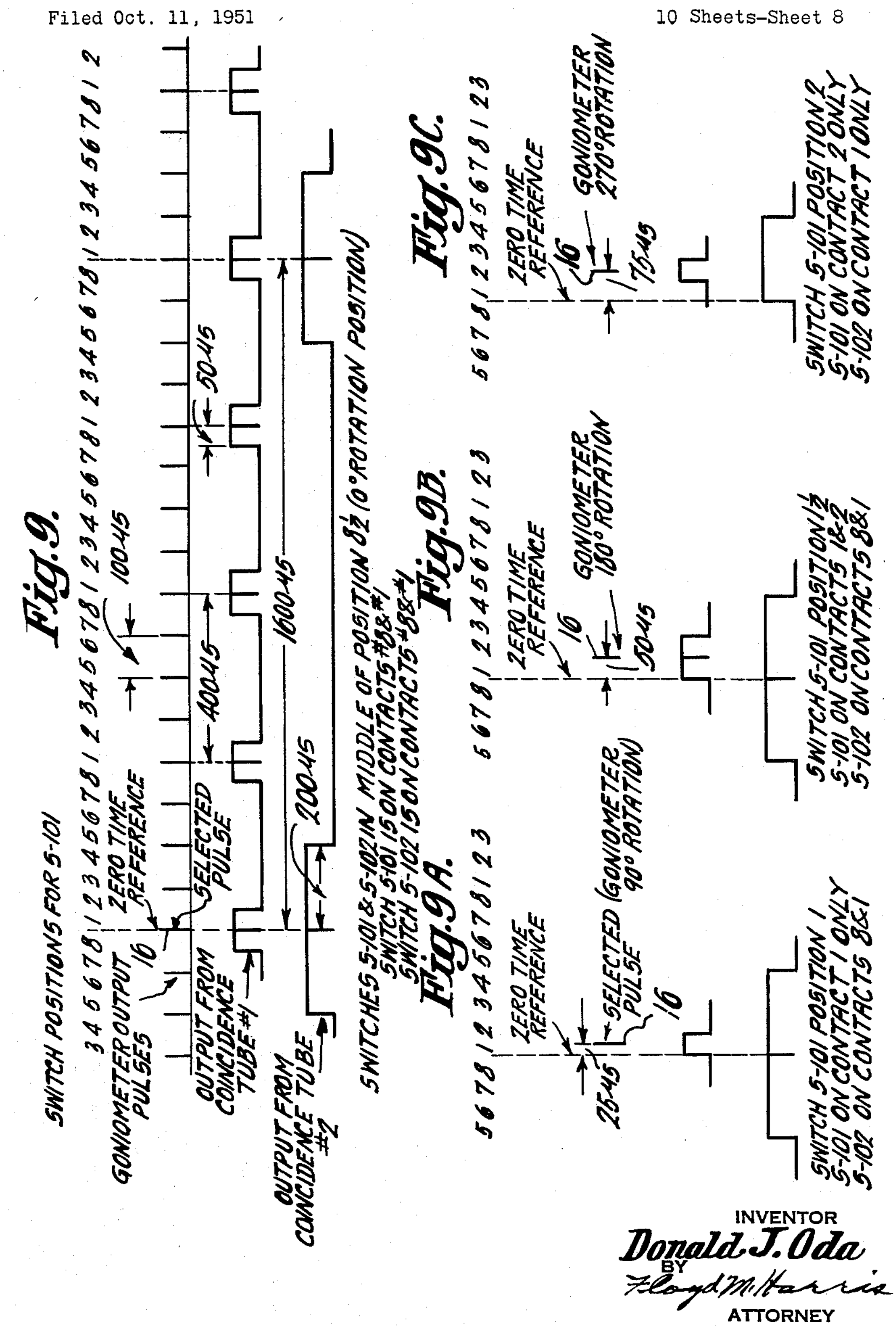
Figs. 9 and 9A to 9I are graphs showing the outputs applied to the coincidence circuit and showing by way of example how these outputs change in character and timing for ten successive switch positions.
Figures 9D, 9E, 9F, 9G, 9H, 9I:
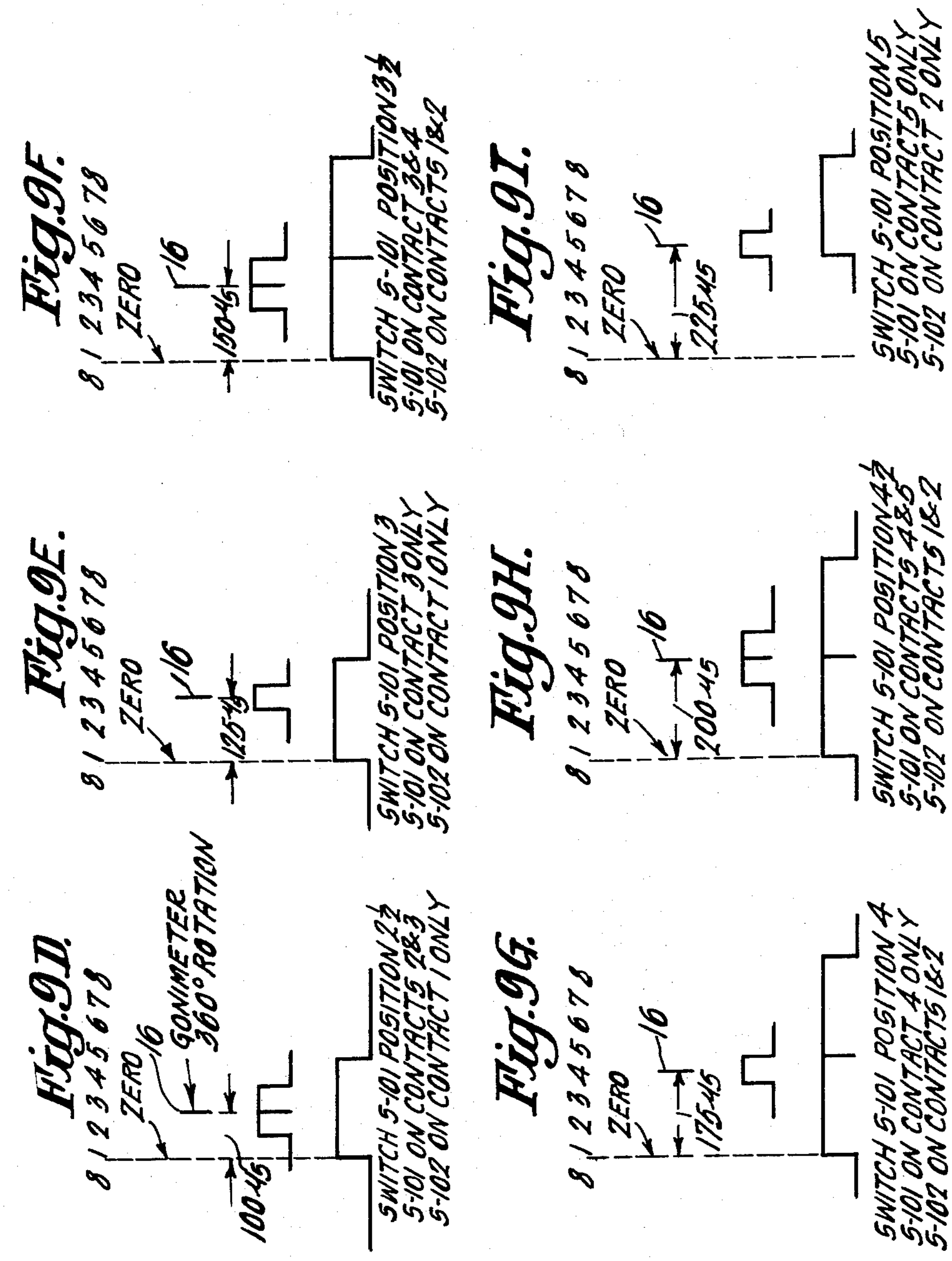

Referring again more particularly to Figs. 1A and 1B, the binary stages Nos. 1, 2, and 3 in cooperation with a switch S–101 (both front and rear) and a double coincidence tube No. 1 produce the pulse of 400 μs. repetition period shown in Figs. 9 to 9I. The width of this pulse is 50 μs. when it is a single width pulse and 100 μs. when it is a double width pulse. The switch S–101 comprising the front and rear wafer sections may be referred to as one bank of switches.

The binary stages Nos. 3, 4, and 5 in cooperation with a switch S–102 (both front and rear) and a double coincidence tube No. 2 produce the pulses of 1600 μs. repetition period shown in Figs. 9 to 9I. The width of this pulse is 200 μs. when it is a single width pulse and 400 μs. when it is a double width pulse. The switch S-102 comprising front and rear wafer sections may be referred to as a second bank of switches. It should be noted that the middle stage (stage No. 3) is an overlap stage, that is, it is connected to both switch S–101 and S–102. This overlap of one stage is necessary so that the coincidence circuit associated with the second switch bank gives an output which is capable of selecting, for one repetition of the binary chain cycle, only one output of the coincidence circuit associated with the first switch bank. Two outputs would be periodically selected if no overlap stage were used. This will become apparent later as the explanation is continued.

Before describing the combination of binary stages, count selecting switches and double coincidence tubes more fully, reference will now be made to the goniometer phase shifting circuit that produces the narrow pulses of 100 μs. repetition period shown at the top of the group of graphs in Figs. 9 to 9I.

As shown in Figs. 1A and 1B and in Fig. 2, a 10 kc. sine wave signal may be obtained by supplying square wave output of binary stage No. 1 to a filter 51 tuned to 10 kc. The resulting 10 kc. sine wave is fed to a goniometer driver tube 52 and then applied to the rotor of the goniometer type phase shifter 17. This phase shifter is of well known design and includes a quadrature network comprising capacitor 53 and resistor 54 connected between the stator windings and the output connection 56.

The output of phase shifter 17 is amplified, clipped and differentiated by the units 57, 58, and 59 (Fig. 2) in the block 61. The positive pulses of the resulting output wave 62 are the desired narrow pulses of 100 μs. repetition period. The negative pulses of wave 62 may be ignored since they have no effect on the coincidence tube 15 to which wave 62 is applied.

At this point it should be explained that the complete coincidence circuit (which might also be referred to as a gating circuit) comprises the double coincidence tube No. 1 having sections A and B, the double coincidence tube No. 2 having sections A and B, a double diode 63, and the coincidence tube 15.

The output pulses of coincidence tubes Nos. 1 and 2 are applied to the plates of the double diode 63 with negative polarity as indicated. Since the diode plates are positive in the absence of applied negative pulses, there will be current flow through both diode sections and through a load resistor 64 in the absence of such pulses. Each time that the two diode plates are driven negative simultaneously, the cathode end of load resistor 64 goes negative the maximum amount. Thus there is applied through a coupling capacitor 66 to the cathode of coincidence tube 15, which is provided with a cathode resistor 67, a maximum negative pulse of either 50 μs. or 100 μs. depending upon whether it is a single or double width pulse. The repetition period of this maximum negative pulse is 1600 μs. since it is determined by the repetition period of the 1600 μs. pulse from coincidence tube No. 2.

The goniometer controlled pulses of 100 μs. period are applied through a grid capacitor 68 to the control grid of coincidence tube 15. A grid leak resistor 69 is provided. The capacity and resistance values of 68 and 69 are such as to provide grid leak biasing, in a manner well known in the art, the positive pulses driving the control grid positive periodically to produce grid current.

The bias adjustment of the coincidence tube 15 is such that the tube is biased beyond plate current cut-off so that there is plate current only when the cathode is driven negative a maximum amount and at the same time a positive 100 μs. period pulse 16 is being applied to the control grid. The result is that only the goniometer controlled pulses 16 appear at the plate of tube 15, and these pulses have a repetition period of 1600 μs. These are the desired pulses that may be continuously and precisely varied in delay or timing.

It should be noted that various coincidence circuits may be employed in place of the one illustrated. While the dual coincidence tube feature employed at coincidence tubes No. 1 and No. 2 is an important feature of this invention, it will be apparent that various modifications may be made in this portion of the circuit if desired.

Reference will now be made to the circuit arrangement for coincidence tubes No. 1 and No. 2. In the example shown, these tubes have their grids connected to a fixed negative bias that may be adjusted by a tap 50 on a bias resistor 55. A by-pass capacitor 60 is connected between the tap 50 and ground.

Additional negative bias on the grids of the No. 1 and No. 2 coincidence tubes is provided by grid leak biasing, the grid capacitors and grid leak resistors having suitable values to provide the proper bias.

Figure 6:
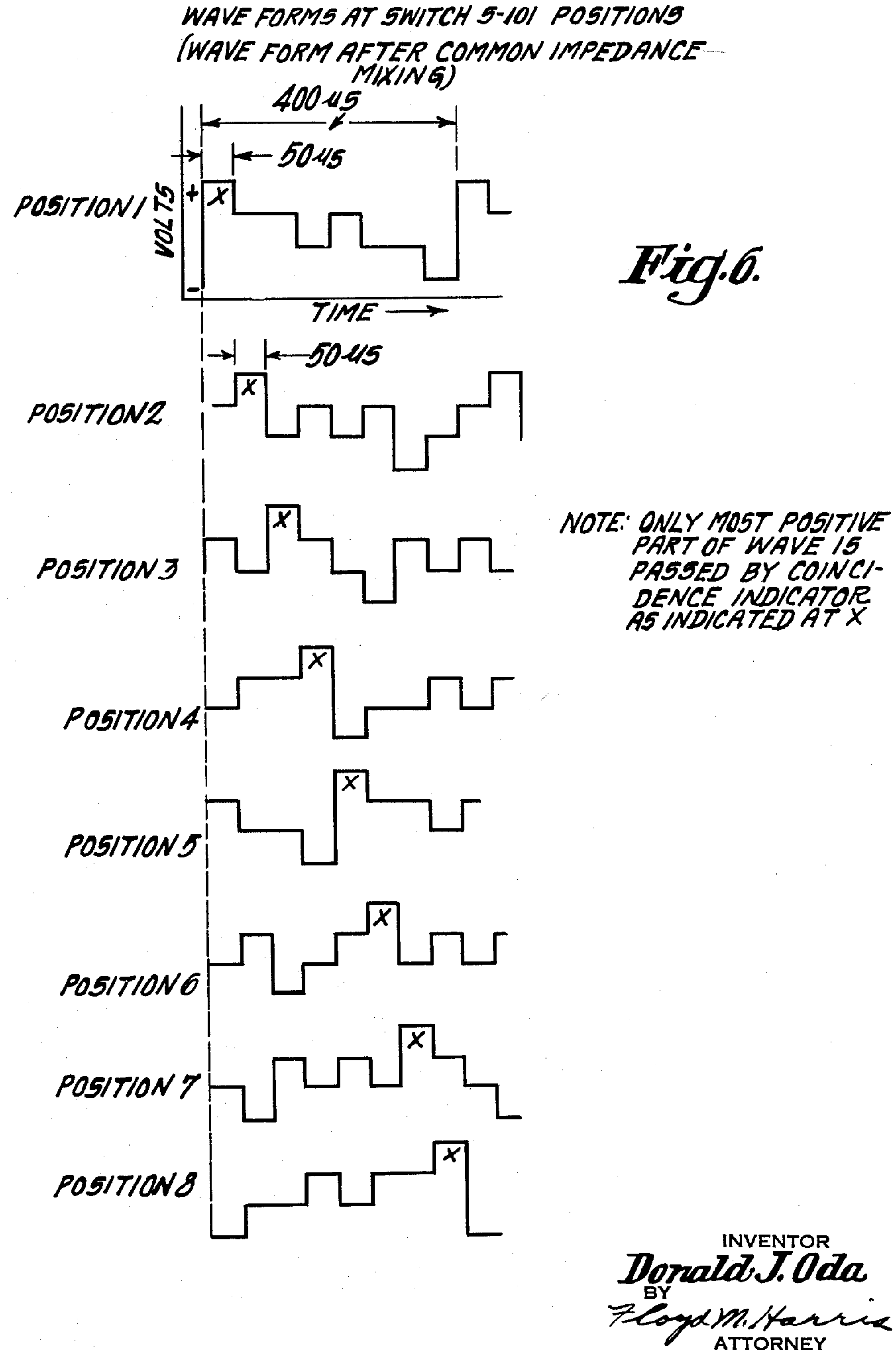
Fig. 6 is a group of wave forms showing how the selected plate wave forms add to give a proper wave form to be applied to the coincident circuit.

The bias adjustments preferably are as follows: The tap 50 is adjusted so that with no signal on the grids, the coincidence tubes No. 1 and No. 2 are biased beyond cut-off. The fixed bias and the grid-leak bias together are chosen so that plate current flow will occur in a coincidence tube only on the most positive excursion of the signal being applied to a coincidence tube grid. Now refer to Fig. 6. Fig. 6 shows wave forms which are supplied to the grid of coincidence tube No. 1 through proper switching to be explained later. The wave forms supplied to the grid of coincidence tube No. 2 are similar to those shown in Fig. 6. It is apparent that when a delay switch in a particular position conducts a specific wave form to a coincidence indicator tube grid, the tube will give an output unique in time delay for that position of the delay switch.

The method and means by which the pulse outputs from coincidence tubes Nos. 1 and 2 are obtained will now be described in more detail. Refer to Figs. 1A and 1B and to Fig. 7. Fig. 7 shows that the binary counter switching operation goes through four phases as a count selecting switch is rotated. Assume that Fig. 7 represents the operation of binary stage Nos. 1, 2, and 3 with switch S–101 and coincidence tube No. 1.

With switch S–101 (front) on contact point 1 only (position 1), the wave form for position No. 1 (refer to Fig. 6) is applied through the switch and the lead 71 to section A of coincidence tube No. 1. The wave form for position No. 1 is the result of premixing the plate wave forms from 1–A, 2–A, and 3–A in the mixing resistors 91, 92, and 93 of Fig. 1B. Thus, only the most positive portion of the input wave form appears at the output of coincidence tube No. 1. This pulse will be referred to as pulse "A" since it comes from the "A" side of coincidence tube No. 1.

As S–101 is rotated, the switch blade of S–101 (rear) makes contact with contact point 2 (rear) while switch blade of S–101 (front) still makes contact with contact point 1. This is referred to as position 1½. S–101 (front) is still in position No. 1 while S–101 (rear) is in position No. 2. The wave form for position No. 2 (refer to Fig. 6) is connected through S–101 (rear) and a lead 72 to the B section of coincidence tube No. 1. The output of coincidence tube No. 1 as a result of the wave form for position No. 2 will be referred to as pulse "B" since it comes from the "B" side of tube No. 1. Sections A and B of tube No. 1 have a common plate load, therefore, the wave form for phase 2 (Fig. 7) will appear at the plate of tube No. 1.

As S–101 is further rotated, S–101 (front) loses contact while S–101 (rear) maintains contact. This is phase 3 and only the 50 $\mu$s. wide delayed B pulse appears at the output of coincidence tube No. 1. The important feature to note is that in going from phase 1 to phase 3, the pulse output of coincidence tube No. 1 has been delayed without momentarily losing any pulse output during the switching operation.

As switch S–101 is further rotated to position 2½ S–101 (front) makes contact with position No. 3 contact, while S–101 (rear) maintains contact with position No. 2 contact. This is phase 4. Again a double width pulse appears at the output of coincidence tube No. 1. The output of coincidence tube No. 1 in phase No. 4 is a 100 $\mu$s. pulse, the leading edge of which is delayed 50 $\mu$s.

As switch S–101 is rotated still further S–101 (rear) loses contact while S–101 (front) maintains contact. Only the 50 $\mu$s. "A" pulse is present at the plate of tube No. 1. The leading edge has been delayed 100 $\mu$s. Thus, the system is back to phase 1. As the switch is further rotated the several phases repeat. Odd numbered contacts are made on S–101 (front) while even numbered contacts are made on S–101 (rear). This is done to keep the premixed wave forms isolated during switching. If the wave forms are not isolated, the adjacent wave forms will mix and cause outputs which are of no value.

As will be discussed later in connection with Fig. 8, the angular dimension of the switch blade is such that the switch blades are on contact 1, on both contacts 1 and 2, and on contact 3, et cetera, each for the same number of degrees of switch rotation .

Referring particularly to Figs. 1A and 1B, it is thought that the drawing is self-explanatory as to the switch connections to the several binary stages. In this particular example of the invention, each switch contact point is connected through three impedance mixing or adding resistors to three different plates of the binary stages. Contact 1 of S–101, for example, is connected to terminal 1–A (plate A) of binary No. 1, to terminal 2–A (plate A) of binary No. 2, and to terminal 3–A (plate A) of binary No. 3.

In the example illustrated, the switches S–101 and S–102 are wafer switches of a well known type.

Reference to Fig. 9 will show that the pulses appearing at the output of coincidence tube No. 1 have a repetition rate one-fourth that of the goniometer controlled pulses, and that the pulses from coincidence tube No. 2 have a repetition rate one-fourth that of the pulses from coincidence tube No. 1. Therefore, 4 to 1 reduction gearing is required between the goniometer 17 and the switch S–101 as shown at 73. Likewise, 4 to 1 reduction gearing is required between switches S–101 and S–102 as indicated at 74. Mechanical connections are indicated by dash-dot lines.

A crank 76 may be connected, through gearing 77 if desired, to the shaft of the rotor of goniometer phase shifter 17 for cranking the output pulses 16 through the desired delayed position. A Veeder counter 78 may also be connected to the rotor shaft of goniometer 17 so that the amount the pulse 16 has been delayed with respect to its zero reference position can be read off the Veeder counter. In the example being described, one rotation of the goniometer rotor shifts the output pulse 100 $\mu$s. in time.

Figure 4:
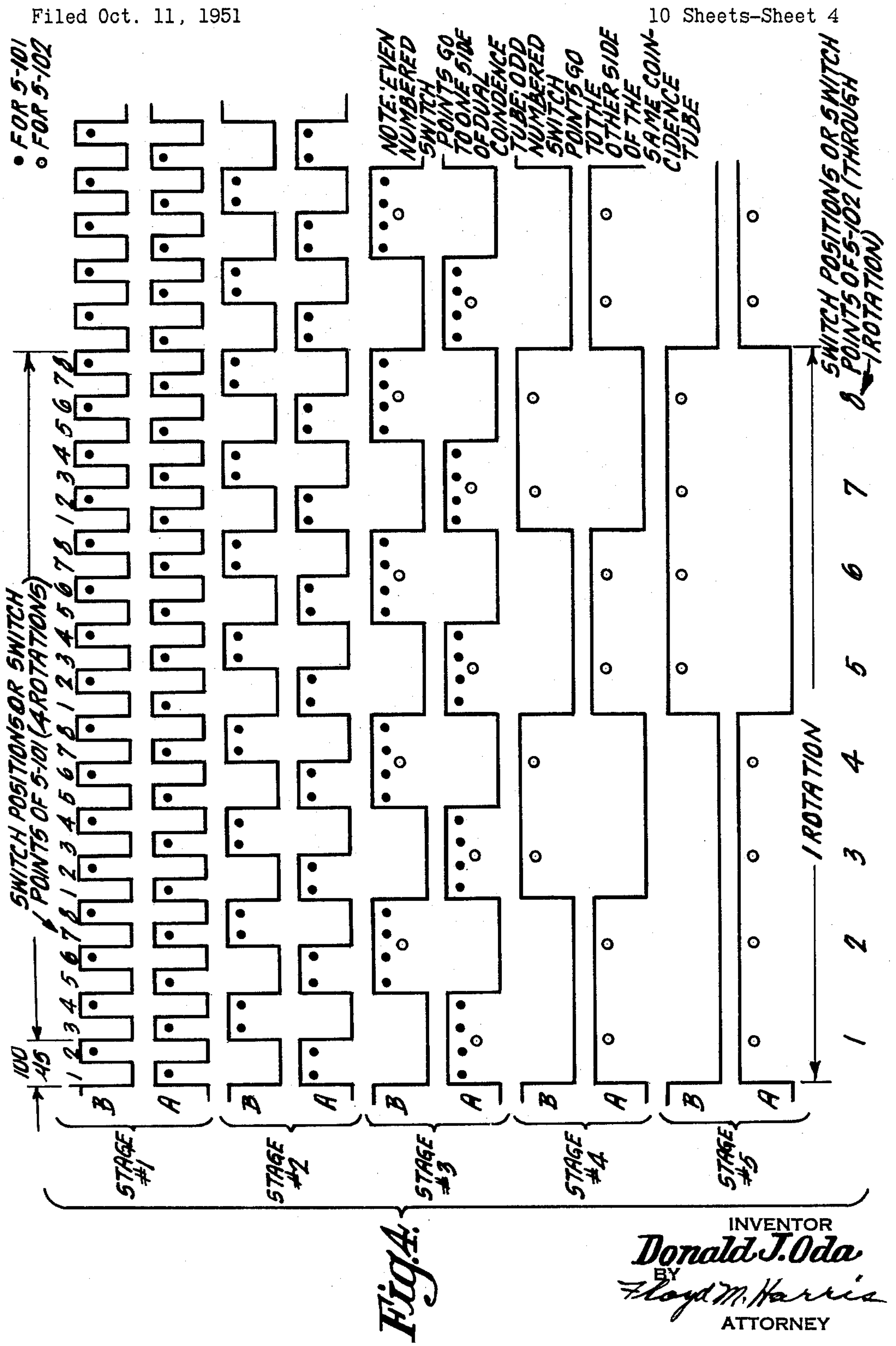
Fig. 4 is a group of graphs showing the outputs at the plates in the several stages in the binary counter chain of Fig. 1B, and also indicating which plate outputs should be applied to the coincident circuit to get a pulse of the desired delay.

Reference to Fig. 4 will aid in understanding the operation of the five binary stages. This is a well known type of diagram showing the wave forms appearing at the A and B plates of the several binary stages.

At the same time reference may be made to Fig. 5 which gives the same information as Fig. 4 in different form. Fig. 5 is a tabulation of the binary counter plates necessary to mix in order to get correct delay for each of the switch positions on S–101 and S–102.

In Fig. 4 the correct switch connections to the binary plates to obtain the desired delayed output are indicated by dots for switch S–101 and by circles for switch S–102. The switch positions for the two switches S–101 and S–102 are also indicated.

It will be seen from the dots under switch position 1 for S–101 that the A plates of stages 1, 2, and 3 should be connected to a coincidence tube (No. 1) through mixing resistors to obtain the first 50 $\mu$s. A pulse from stage No. 1. Similarly, the circles show that the A plates of stages 3, 4, and 5 should be connected to a coincidence tube (No. 2) to obtain the first 200 $\mu$s. A pulse from stage No. 3.

From Fig. 4 it will also be seen that as the switches are rotated to position 1½ (not indicated as such on the drawing) to put the switch blades of S–101 (front and rear) on both contact 1 and contact 2, respectively, both the A pulse and the B pulse will be obtained at the output of coincidence tube No. 1. The output at coincidence tube No. 2 from stages 3, 4, and 5 remains unchanged because 4 to 1 gear reduction has not allowed sufficient rotation of S–102 to give a new position.

Rotation of S–101 to switch position 2 causes the A pulse to be dropped, only the B pulse remaining.

Rotation of switch S–101 to switch position 2½, again causes both pulse B and pulse A to appear.

The entire switching sequence can be followed through on the graphs of Fig. 4 in the manner indicated above.

A better understanding of the system may be obtained by referring to Figs. 9 to 9I. These graphs show the time relation of the three pulse signals applied to that portion of the coincidence circuit comprising tube 15 and diodes 63. In other words, these graphs show the goniometer controlled pulses 16 and the output pulses from the double coincidence tubes No. 1 and No. 2.

Figs. 9 to 9I show the time relations for ten successive switch positions of S–101, starting with position 8½ where the output pulse 16 is at zero delay. It is believed that these graphs require no further explanation.

A reference pulse occurring at zero reference time may be desirable. It may be obtained as shown in Fig. 1B by connecting the A plate of the last binary stage No. 5 to a differentiating circuit comprising capacitor 81 and resistor 82. A diode 83 across resistor 82 clips off the negative pulses.

It should be understood that the invention is not limited to a system employing a continuous phase shifter such as the goniometer. For example, only the outputs of coincidence tubes Nos. 1 and 2 might be applied to a final coincidence tube so as to obtain as the output pulses the pulses from coincidence tube No. 1. In that case it might be desirable to increase the frequency of the pulses driving the counter chain so that more narrow output pulses might be obtained from coincidence tube No. 1. With such an arrangement the delay of the output pulse will be in small discrete steps but for some applications that may not be objectionable.

Fig. 8 shows one example of a satisfactory switch design. Here it is seen that the correct angular dimension of the switch blade is 56½ degrees when the effective contact angle of the switch point or clip is 11 degrees. The switch blades and contact clips of switch S–102 are the same as those for switch S–101. With this design the switch blades of S–101, for example, are on contact 1 alone, on both 1 and 2, and on 2 alone, each for the same number of degrees of switch rotation. The blades for S–101 (front) and S–101 (rear) are in line or in phase with respect to rotation. S–101 (front) contacts odd positions while S–101 (rear) contacts even positions.

The way in which the correct switch blade angular dimension can be figured will be understood from the following discussion. First, assuming pinpoint contacts, with an eight position switch, there are 45 degrees between positions (360 degrees divided by 8). If the switch blades were to make only one contact at a time, the angular widths of the switch blades obviously should be 45 degrees. If the switch blades were always to be on two contacts at a time, the widths of the switch blades should be 90 degrees.

In the present case where the switch blades are to be on points 1, points 1 and 2, and point 2 successively (still assuming pinpoint contacts) the angular widths of the switch blades should be the average of the two blade widths just mentioned or ½ (45+90)=67½ degrees.

Referring now to the specific example illustrated in the drawing (Figs. 1A and 1B and in Fig. 8) where the effective contact angle of each switch point or clip is 11 degrees, the correct angular width of the switch blade for both S–101 (front and rear) is 67½ degrees minus 11 degrees equals 56½ degrees.

From the foregoing description it will be apparent that I have provided a system for selecting pulses from a binary counter chain that are delayed the desired amount without losing delayed pulse signal in the process. It will be also apparent that I have provided an improved system for obtaining a pulse of a certain repetition rate that is accurately and continuously variable in delay.

It should be understood that provision may be made for making the binary counter chain operate at different selected repetition rates. This may be accomplished in well known manner by providing additional count selecting switches, an additional coincidence circuit, and a reset circuit. In this case the reset pulse may be considered as being the zero reference. The counter chain is allowed to run through a complete normal cycle. Reset does not affect the delay switching circuits but may introduce undesirable transients in the goniometer circuit, depending on exact reset time. Therefore approximately 7 cycles of the goniometer frequency should be allowed to elapse before the goniometer output is used for a delayed pulse. Reference is made to Patent No. 2,523,244, issued September 19, 1950, to J. D. Woodward which discloses the feature of connecting both repetition rate switching and delay switching to one chain of counters.

Where the invention is applied to a Loran navigation system such as disclosed in the Woodward patent, the binary counter chain includes additional binary stages, additional geared switches and additional coincidence tubes. Such a Loran system also includes the repetition rate selection switches previously mentioned. Such an extension of the circuit herein illustrated is necessary in a Loran system to obtain the delays and repetition rates required by present Loran standards.

In cases where a second adjustably delayed pulse output is desired, as in a Loran system employing dual presentation, a second set of delay or pulse selecting switches and coincidence circuits may be tied in to the binary counter stages. This is possible since the switches do not load the counter stages very much.

It will be apparent to those skilled in the art that the present invention is not limited to the particular circuit embodiment illustrated. For example, the invention is not limited to the particular coincidence circuit arrangement illustrated.

It will also be apparent that the count selecting switches S–101 and S–102 may have more or less contact points than the eight contact points illustrated, the switch blade angular width and the gear ratio being changed in accordance with the number of contact points and binary stages employed. For example:

Seven binary stages may be employed, the fourth stage being the overlap stage. Each switch has 16 contact points instead of 8 as shown in Fig. 1B. The switch blade angular width (assuming an 11 degree effective contact angle of the contact points) is 22¾ degrees. The reduction gear ratio is 8 to 1, the gearing being between a switch corresponding to switch S–101 of Fig. 1B and a switch corresponding to S–102 of Fig. 1B. The proper connections from switch contact points to the plates of the binary stages will be apparent from the foregoing description of the embodiment of Figs. 1A and 1B. However, a tabulation indicating connections to and including the overlap stage 4 is given in Fig. 10. This is the same type of tabulation as given in Fig. 5. The tabulation given is for the switch corresponding to S–101. It will be noted from Fig. 5 that a tabulation of connections for the other switch (corresponding to S–102) and the 4th, 5th, 6th, and 7th stages would be a duplicate of that given for the first switch and the first four stages.

As previously mentioned, when the invention is employed in a Loran receiver that is to operate on present Loran system standards, additional binary stages should be added. An example of one such suitable design will now be given. This embodiment is shown schematically in Fig. 11.

Nine binary stages are connected in cascade. So far as the first five stages are concerned, the system may be the same as shown in Figs. 1A and 1B of the drawing. The last five stages with their connections are a repetition of the first five stages, i. e., a reference to the description of Figs. 1A and 1B shows exactly how binary stages five to nine and their switches and coincidence circuits are connected.

In this nine stage embodiment, stages Nos. 3, 5, and 7 are overlap stages. Each switch has eight contact points as in Fig. 1B and is otherwise designed the same as in Fig. 1B. There are four banks of switches, i. e., two banks for stages one to five, and two banks for stages five to nine. Each bank of switches is mechanically connected to the succeeding bank through a 4 to 1 reduction gear. Thus, including the gearing to the goniometer, there are four 4:1 reduction gears.

It will be apparent that the last two banks of switches (connected into stages 5 to 9) feed into two double coincidence tubes corresponding to coincidence tubes No. 1 and No. 2 of Fig. 1A, and that there is an output pulse from a coincidence tube corresponding to tube 63 of Fig. 1A. Thus it will be seen that the final coincidence tube 15 for the specific Loran embodiment should have an additional input electrode to which the additional output pulse is applied. One obvious solution is to provide the tube 15 with another control grid to function as the additional input electrode. Since the output of the double diode (corresponding to tube 63) is negative, a polarity reversing tube should be provided so that a positive polarity pulse is applied to the additional input electrode of the final coincidence tube.

Figures 12, 13:
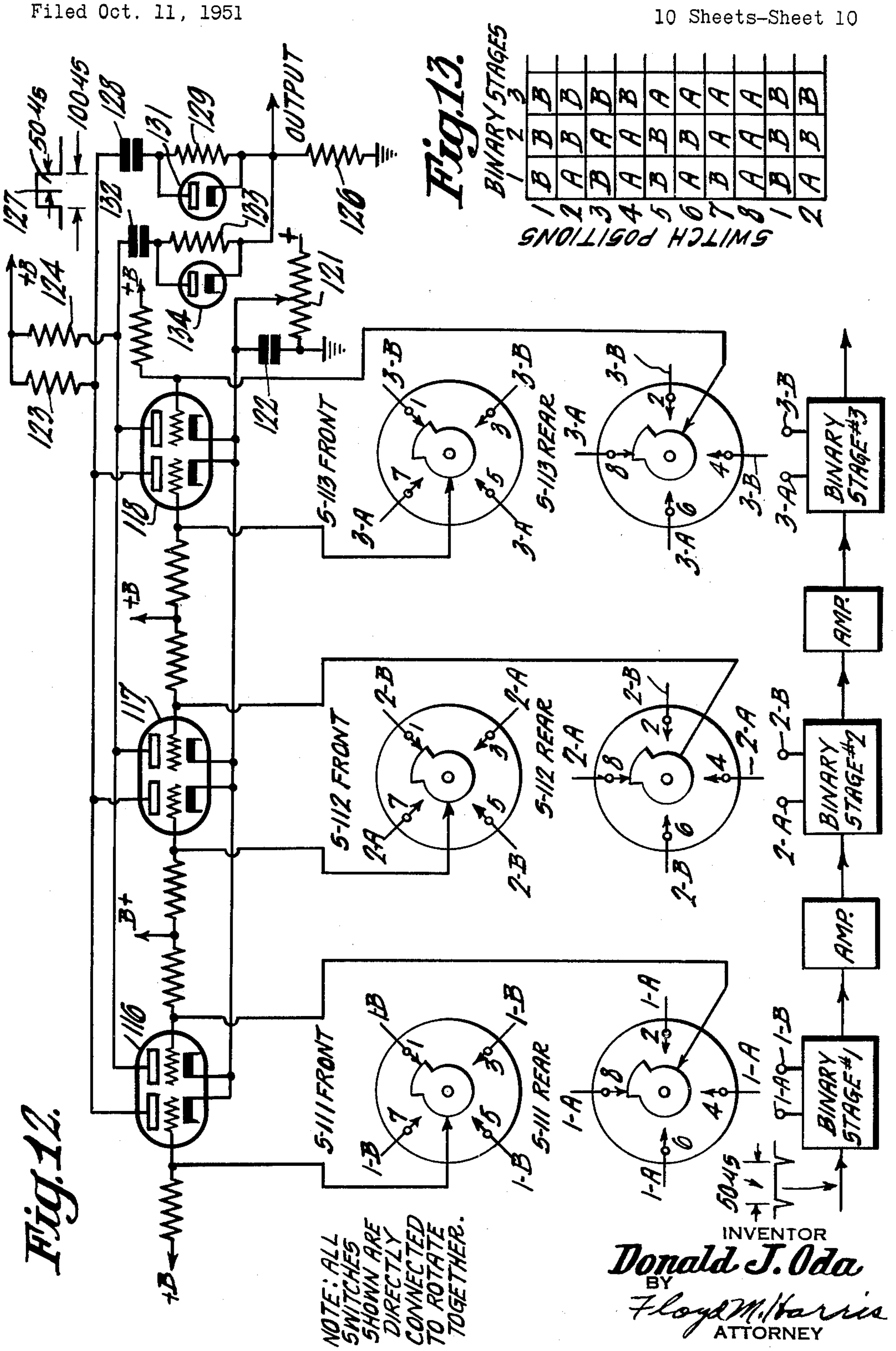
Fig. 12 is a circuit diagram of another embodiment of the invention employing a different switch and coincidence circuit arrangement.
Fig. 13 is a tabulation of the correct binary plate connections in Fig. 12 to give the desired count for the different switch positions.

In the embodiment of the invention shown in Figs. 1A and 1B, the switching arrangement employs impedance mixing so as to reduce the number of switches and tubes required. Fig. 12 shows an example of an embodiment of the invention that does not employ impedance mixing at the switches.

The switching and coincidence tube layout of Fig. 12 may be substituted for that shown in Figs. 1A and 1B if desired. In that case there would be five binary stages, only three of which are shown in Fig. 12. As in Figs. 1A and 1B, stage No. 3 would be the overlap stage.

Fig. 12 shows three switches S–111, S–112, and S–113 (each having a front wafer and a rear wafer) which comprise one bank of switches directly connected to each other to rotate together. It also shows a coincidence circuit comprising three double coincidence tubes, 116, 117, and 118. A complete five counter stage system includes a second bank of similar switches with similar connections to the last three counter stages. A complete five stage system also includes a coincidence circuit comprising three double tubes corresponding to tubes 116, 117, and 118 which are connected to the second bank of switches in the same manner as shown in Fig. 12.

The switches of Fig. 12 may be designed the same as those in Fig. 1B. The two banks of switches are connected through a 4 to 1 reduction gear as in Fig. 1B.

The connections of the switch points to the plates of the binary stages are indicated in the same manner as in Fig. 1B. It will be seen, for example, that all contact points of S–111 (front) connect to the plate 1–B of the binary stage No. 1, and that all contact points S–111 (rear) connect to the plate 1–A of stage No. 1.

In the particular example shown in Fig. 12 the negative side of the multivibrator (a binary stage) is used for the count. All B plates of the binary stages are negative at the start of the count. (Refer to Fig. 4.)

Fig. 13 is a tabulation showing the binary plate connections for the different switch positions to obtain the desired count in the embodiment of Fig. 12.

Now referring to the coincidence circuit of Fig. 12, each of the double vacuum tubes 116, 117, and 118 may, of course, be separate tubes if desired. The cathodes of these tubes are connected together and connected to a positive bias resistor 121 shunted by a by-pass capacitor 122.

The left-hand sections of tubes 116, 117, and 118 have their plates connected to a plus B source through a plate resistor 123. The right-hand sections of these tubes have their plates connected to plus B through a plate resistor 124.

The grids of tubes 116, 117, and 118 are connected through high impedance resistors to plus B so that the tubes are normally conducting. The amount of conduction may be adjusted by the bias on the cathodes.

The left-hand grids of tubes 116, 117, and 118 are connected to the switch blades of the front wafers of switches S–111, S–112, and S–113, respectively. The right-hand grids of tubes 116, 117, and 118 are connected to the switch blades of the rear wafers of switches S–111, S–112, S–113, respectively.

It will be apparent that when a negative pulse is applied from a binary stage through a switch to the grid of a coincidence tube such as tube 116, the plate associated with said grid attempts to go more positive to put out a positive pulse. The left-hand grids of tubes 116, 117, and 118 must all be negative at the same time in order to get an output pulse. Thus output pulses developed across resistor 123, which is the plate load for the coincidence tube circuit composed of left-hand grids, will be 50 $\mu$s. wide and delayed an amount depending on the position of the delay switches S–111 (front), S–112 (front), and S–113 (front). When the front rotor blades of the switch bank S–111, S–112, S–113 are making no contact, no output pulse is developed across resistor 123. Furthermore, if switch S–111, S–112, and S–113 are on a switch overlap position, such as 8½ for example, the left-hand side of tubes 116, 117, and 118 function properly, that is, one side of the tubes while receiving negative pulses are not rendered ineffective while pulses are being applied to the grids on the right-hand side of tubes.

Assume the switches in Fig. 12 are on switch position 8½. On count 8 the right-hand grids of tubes 116, 117, and 118 are driven negative by the negative A plate wave forms from binary stages 1, 2, and 3, respectively. Stage No. 1 causes a positive pulse to be produced in resistor 124, Fig. 12. The next succeeding count is count 1. On this count the B plates of stages No. 1, 2, and 3 are negative so that the left-hand grids of tubes 116, 117, and 118 are driven negative, allowing stage No. 1 to produce a positive pulse across resistor 123, Fig. 12.

These two positive pulses combine in a common output resistor 126 to produce a double width pulse 127 at the switch position 8½. The action is substantially the same as described in connection with Figs. 1A and 1B. It will be noted that output resistor 126 is a common output circuit for the pair of tubes 116, the pair of tubes 117, and the pair of tubes 118.

The connections from the plates of tubes 116, 117, and 118 to the common resistor 126 may be as shown in Fig. 12. The left-hand plates are connected through a coupling capacitor 128 and a resistor 129 to the upper end of resistor 126, the other end being grounded. Resistor 129 is shunted by a diode 131 with the diode plate connected to the end of the resistor remote from resistor 126.

Similarly, the right-hand plates of tubes 116, 117, and 118 are connected through a coupling capacitor 132 and a resistor 133 to the upper end of common resistor 126. A diode 134 is shunted across resistor 133 with its plate connected to the end of resistor 133 remote from resistor 126.

Diodes 131 and 134 may be omitted although their use improves the circuit operation. The diodes function as follows. Diode 134 allows most of the positive signal developed across resistor 124 to appear across output resistor 126. Diode 131 allows most of the positive signal developed across resistor 123 to appear across resistor 126. However, a positive signal developed across output resistor 126 through diode 131 is isolated from capacitor 132 and the associated circuitry by diode 134 and the large impedance resistor 133. Diode 131 also serves as an isolating diode.

The output across resistor 126, Fig. 12, is similar to the output of coincidence tube No. 1, Figs. 1A and 1B, except the output across resistor 126 is reversed in polarity. The output across resistor 126 could be reversed in polarity and fed into tube 63, Fig. 1A, in place of using output from tube No. 1 and the resulting circuitry would function properly. Of course the switch bank consisting of S–111, S–112, and S–113, Fig. 12, would have to be geared to the switch bank S–102, Fig. 1B, through a 4 to 1 gear reduction.

Next, assume the switches in Fig. 12 are on position No. 1. No pulse will be developed across resistor 124 but a 50 $\mu$s. pulse representing count 1 will be produced across resistor 123.

As the delay switches S–111, S–112, and S–113 are advanced through the positions, the odd counts will be developed across resistor 123 while the even counts will be developed across resistor 124. The counts developed in resistor 123 and resistor 124 are common impedance mixed in resistor 126. The output across resistor 126 goes through the phases portrayed in Fig. 7.

What is claimed is:

1. In combination a binary counter stage of the type having two output terminals, one of which is positive when the other is negative, a count selecting switch, a coincidence circuit including a pair of coincidence tubes having a common output circuit and each having a separate input circuit, means including said count selecting switch for connecting in sequence as said switch is operated in one direction first only one of said terminals to one of said coincidence tube input circuits, then both of said terminals to both of said coincidence tube input circuits, respectively, and then only the other of said terminals to the other of said coincidence tube input circuits.

2. In combination, a first binary stage and a second binary stage in cascade, each of said stages having an A output terminal that is positive when the other or B output terminal is negative, the A and B terminals of each stage supplying A and B pulses, respectively, a count selecting switch, a pair of coincidence tubes having a common output circuit and having separate A and B input circuits, respectively, means including said switch for connecting in sequence as said switch is operated in one direction from a position 1 through successive positions only the A terminal of said first binary and only the like polarity A terminal of said second binary to the A input circuit of said coincidence tubes; then both said A and B terminals of said first binary to said A and B coincidence tube input circuits, respectively, and also said A terminal of said second binary to both of said coincidence tube input circuits; then only the B terminal of said first binary to the B input circuit of said coincidence tubes and also said A terminal of said second binary to said B input circuit of said coincidence tubes; and then again said A and B terminals of said first binary to the A and B input circuits, respectively, of said coincidence tubes, and also said A terminal of said second binary to the B input circuit of said coincidence tubes, and also said B terminal of said second binary to said A input circuit of said coincidence tubes.

3. In combination, a plurality of binary counter stages connected in cascade, each of the type having an A terminal and a B terminal one of which is positive when the other is negative, each of said stages having a square wave signal appearing at its terminals, the wave appearing at the A terminal being referred to as the A pulse and the wave appearing at the B terminal being referred to as the B pulse, count selecting switching means, a pulse coincident circuit, the said counter stages being so connected through said switching means to said coincidence circuit that for alternate switch positions the A and B pulses from the highest frequency counter stage appear at the output of said coincidence circuit as a double pulse, and for the other switch positions adjacent to said alternate switch positions only the A or B pulse from said highest frequency counter stage appears at said output.

4. The invention according to claim 3 wherein said coincidence circuit includes a dual coincidence circuit having two input circuits and a common output circuit, and wherein said switching means includes at least two separate mechanically coupled switches each having a switch blade connected to said coincidence input circuits, each switch having contact points connected to said binary counter stages, the connections to said contact points and the width of said switch blades being such as to supply, as the switch is moved in one direction, first only an A pulse of the highest frequency counter stage to one of said coincidence input circuits, then both A and B pulses from said highest frequency stage to the two coincidence input circuits, respectively, and then only the B pulse of said highest frequency stage to the other of said coincidence input circuits.

5. The invention according to claim 3 wherein there is an odd number of binary stages and wherein there is a first bank of switches comprising at least two count selecting switches each having a switch blade and associated contact points, said switch blades being directly mechanically connected, and wherein there is a second bank of switches comprising at least two count selecting switches each having a switch blade and associated contact points said last-mentioned switch blades being directly mechanically connected, the first bank of switches being connected to the second bank of switches through reduction gearing, said pulse coincidence circuit having separate input circuits and a common output circuit, said switch blades of the first bank of switches being connected to said separate input circuits, respectively, the contact points of the first bank of switches being connected to the first binary stages including the middle stage of said odd number of stages, a second pulse coincidence circuit having separate input circuits and a common output circuit, said switch blades of the second bank of switches being connected to said last-mentioned separate input circuit, respectively, and the contact points of the second bank of switches being connected to the last binary stages including said middle stage.

6. In combination, a plurality of binary counter stages connected in cascade, a pair of coincidence circuits having a common output circuit and each having its own input circuit, a switch that may be moved to successive positions for obtaining in said output circuit pulses of successively increased delay, and count selecting switching means including said switch for so connecting said binary stages to said input circuits as said switch is moved that at said ouput circuit a double width pulse is obtained from the first of said binary stages immediately preceding the time that a single width pulse of increased delay is obtained from said first binary stage.

7. In combination, a chain of an odd number of binary counter stages, a first coincidence circuit comprising at least one pair of vacuum tubes having a common output circuit and each having its own input circuit, a second coincidence circuit comprising at least one pair of vacuum tubes having a common output circuit and each having its separate input circuit, count selecting switching means for so connecting the first of said stages up to and including the middle stage to said first coincidence circuit that, as the switching means is actuated for obtaining in the output circuit of said first coincidence circuit pulses of sucsively increased delay, there is obtained at the output circuit of said first coincidence circuit a double width pulse from the first of said binary stages immediately preceding the time that a single width pulse of increased day is obtained from said first stage, additional count selecting switching means for so connecting the last of said binary stages including said middle stage to said second coincidence circuit that, as said additional switching means is actuated for obtaining in the output circuit of said second coincidence circuit pulses of successively increased delay, there is obtained at the output circuit of said second coincidence circuit a double width pulse from the middle of said binary stages immediately preceding the time that a single width pulse of increased delay is obtained from said middle stage.

8. The invention according to claim 7, wherein the first switching means is connected to the additional switching means through reduction gearing.

9. The invention according to claim 8, wherein there is provided a third coincidence circuit having an input circuit and an output circuit and wherein there is means for supplying the outputs of the first and second coincidence circuits to said input circuit whereby only the output of the first coincidence circuit appears in said output circuit and with a repetition rate determined by the output of said second coincidence circuit.

10. In combination, a chain of five binary counter stages, a first pair of coincidence circuits having a common output circuit and each having its own input circuit, a second pair of coincidence circuits having a common output circuit and each having its separate input circuit, count selecting switching means for so connecting the first three of said stages to the input circuits of said first pair of coincidence circuits that, as the switching means is actuated for obtaining in the output circuit of said first pair of coincidence circuits pulses of successively increased delay, there is obtained at the output circuit of said first pair a double width pulse from the first of said binary stages immediately preceding the time that a single width pulse of increased delay is obtained from said first stage, additional count selecting switching means for so connecting the last three of said binary stages to the input circuits of said second pair of coincidence circuits that, as said additional switching means is actuated for obtaining in the output circuit of said second pair of coincidence circuits pulses of successively increased delay, there is obtained at the output circuit of said second pair a double width pulse from the third of said binary stages immediately preceding the time that a single width pulse of increased delay is obtained from said third stage.

11. The invention according to claim 10, wherein there is a mechanical coupling from the first switching means to the additional switching means through a four-to-one reduction gearing.

12. The invention according to claim 11, wherein there is a third coincidence circuit having an output circuit and a plurality of input connections, and means for supplying the pulse outputs of said first and second pairs of coincidence circuits to said input connections, respectively.

13. In combination, means comprising a source of signal having a stable frequency for supplying a signal having a predetermined frequency, a phase shifter to which said signal is supplied, said phase shifter having a movable member and being of the type that supplies an output that may be continuously variable in delay, a coincidence circuit having an output circuit and having a plurality of input connections, means for supplying said phase shifter output in the form of pulses recurring at a certain repetition rate to one of said input connections, a binary counter chain comprising a plurality of binary counter stages connected in cascade, means for driving said counter chain from said stable frequency source, a pair of coincidence circuits having a common output circuit and each having its own separate input circuit, a switch that may be moved to successive positions for obtaining in said common output circuit pulses of successively increased delay, and count selecting switching means including said switch for so connecting said binary stages to said separate input circuits as said switch is moved that there is obtained at said common output circuit a double width pulse from the first of said binary stages immediately preceding the time that a single width pulse of increased delay is obtained from said first stage, the pulses at said common output circuit recurring at a repetition rate that is a sub-multiple of said certain repetition rate, means for supplying said sub-multiple repetition rate pulses to another of said input connections of said first-mentioned coincidence circuit, and means for mechanically connecting the movable member of said phase shifter to said switch through reduction gearing having a gear ratio that is the same as the ratio of said certain repetition rate to said sub-multiple rate.

14. A counter system comprising in combination a binary counter stage of the type having two output terminals, one of which is positive when the other is negative, a coincidence circuit having two input terminals which are electrically isolated from each other and having a common output circuit and switching means for selectively connecting only one of said output terminals to only one of said coincidence circuit input terminals or only the other of said output terminals to only the other of said coincidence circuit input terminals and for always connecting both of said output terminals to the respective input terminals of said coincidence circuit as the transfer is made from one output terminal connection to the other output terminal connection.

15. In combination, a plurality of binary counter stages connected in cascade, each of the type having two output terminals, one of which is positive when the other is negative, a coincidence circuit having two input terminals which are electrically isolated from each other and having a common output circuit, switching means for selectively connecting only one of the output terminals of one of said stages to only one of said input terminals or only the other of said output terminals of said one stage to only the other of said input terminals and for always connecting both of said output terminals to the respective input terminals as the transfer is made from one output terminal-input terminal connection to the other output terminal-input terminal connection, and further switching means for selectively connecting only one of the output terminals of another of said stages to only one of said input terminals or only the other of said output terminals of said other stage to only the other of said input terminals and for always connecting both of said output terminals of said other stage to the respective input terminals as the transfer is made from one output terminal-input terminal connection to the other output terminal-input terminal connection of said other stage.

References Cited in the file of this patent

UNITED STATES PATENTS

| | | |
|---|---|---|
| 2,404,306 | Luck | July 16, 1946 |
| 2,466,044 | Schoenfeld | Apr. 5, 1949 |
| 2,490,500 | Young | Dec. 6, 1949 |
| 2,493,627 | Grosdoff | Jan. 3, 1950 |
| 2,523,244 | Woodward | Sept. 19, 1950 |
| 2,542,685 | Lawrence | Feb. 20, 1951 |
| 2,574,145 | Freas | Nov. 6, 1951 |